(12) United States Patent
Rohs

(10) Patent No.: US 9,719,582 B2
(45) Date of Patent: Aug. 1, 2017

(54) CONICAL FRICTION RING TRANSMISSION

(71) Applicant: Ulrich Rohs, Dueren (DE)

(72) Inventor: Ulrich Rohs, Dueren (DE)

( * ) Notice: Subject to any disclaimer, the term of this patent is extended or adjusted under 35 U.S.C. 154(b) by 311 days.

(21) Appl. No.: 14/436,545

(22) PCT Filed: Oct. 29, 2013

(86) PCT No.: PCT/DE2013/000640
§ 371 (c)(1),
(2) Date: Apr. 17, 2015

(87) PCT Pub. No.: WO2014/067509
PCT Pub. Date: May 8, 2014

(65) Prior Publication Data
US 2016/0069436 A1 Mar. 10, 2016

(30) Foreign Application Priority Data
Oct. 29, 2012 (DE) .................. 10 2012 021 171

(51) Int. Cl.
F16H 15/42 (2006.01)
F16H 61/12 (2010.01)
F16H 63/06 (2006.01)

(52) U.S. Cl.
CPC ............ F16H 15/42 (2013.01); F16H 61/12 (2013.01); F16H 63/062 (2013.01); F16H 2061/1272 (2013.01)

(58) Field of Classification Search
CPC ........ F16H 15/42; F16H 61/12; F16H 63/062; F16H 2061/1272
See application file for complete search history.

(56) References Cited

U.S. PATENT DOCUMENTS

| 1,128,460 | A | * | 2/1915 | Kubitz et al. | ........... F16H 15/20 192/215 |
| 1,689,685 | A | * | 10/1928 | Reeves | ..................... B23Q 5/16 476/52 |
| 1,844,239 | A | * | 2/1932 | Boehme | ................... F16H 13/14 476/48 |

(Continued)

FOREIGN PATENT DOCUMENTS

CN 1568406 A 1/2005
DE 10 2010 025 007 A1 12/2011
(Continued)

OTHER PUBLICATIONS

English Translation of Chinese Office Action dated Dec. 1, 2016, in CN 201380056582.9.
(Continued)

Primary Examiner — David M Fenstermacher
(74) Attorney, Agent, or Firm — Collard & Roe, P.C.

(57) ABSTRACT

In a conical friction ring transmission, the safety device may have a normal state, in which electrical energy is applied to the safety device, and a failure state, in which the safety device is free of electrical energy, or a bi-stable safety actuator with a normal position and a failure position, and may change the effect parameter of a mechanical articulating element for adjusting a friction ring. An especially compact design of the conical friction ring transmission is thus achieved.

14 Claims, 6 Drawing Sheets

(56) References Cited

U.S. PATENT DOCUMENTS

Figure 1:
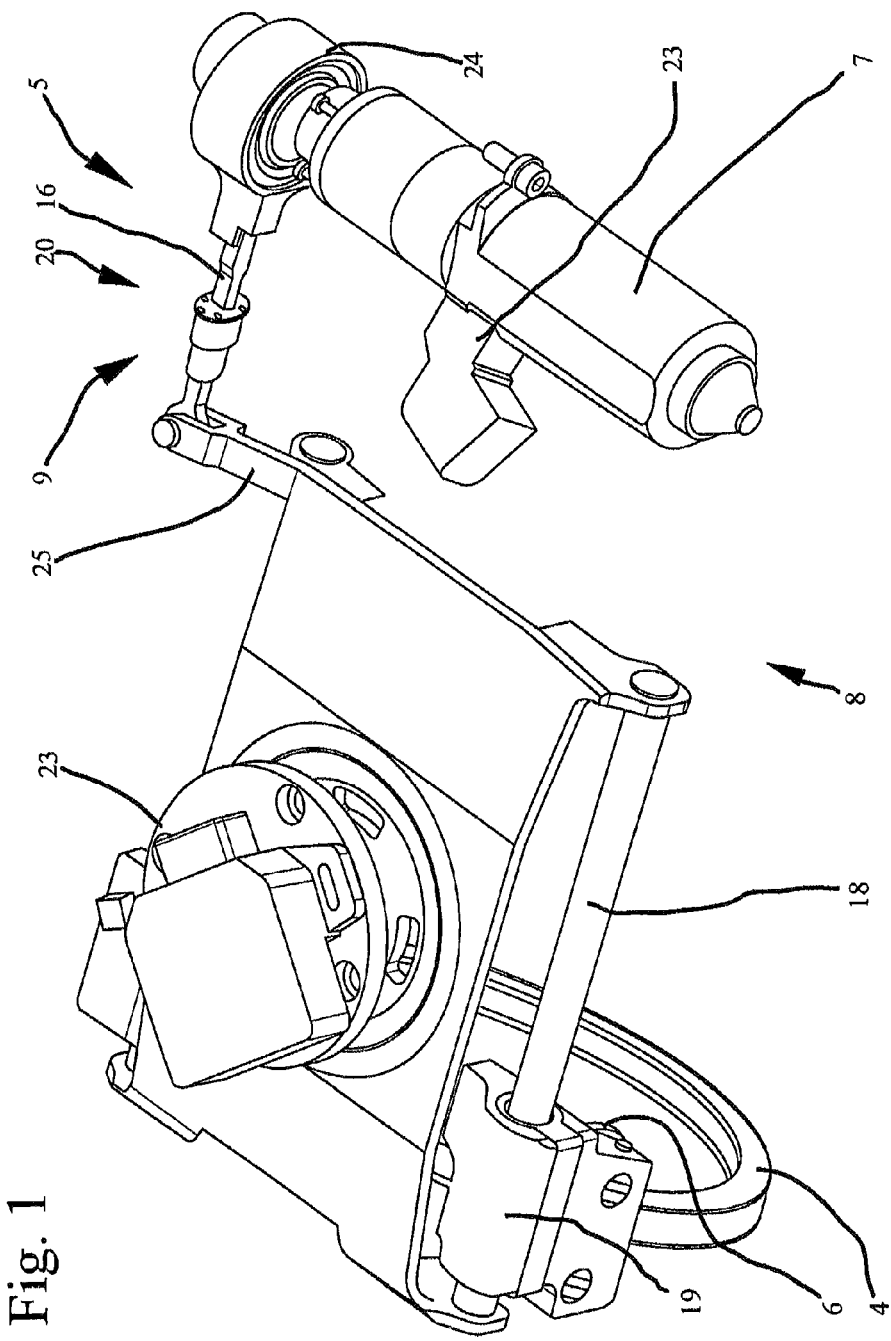

| | | | | |
|---|---|---|---|---|
| 2,424,873 | A * | 7/1947 | Abbrecht | F16H 15/06 15/179 |
| 2,583,790 | A * | 1/1952 | Mikina | F16H 15/20 476/3 |
| 2,611,038 | A * | 9/1952 | Graham | G11B 3/00 369/223 |
| 3,158,041 | A * | 11/1964 | Rae | F16H 15/36 475/215 |
| 3,195,365 | A | 7/1965 | Coakley et al. | |
| 3,286,537 | A * | 11/1966 | Riley | B28B 1/02 476/51 |
| 4,183,253 | A * | 1/1980 | Borello | F16H 15/20 476/16 |
| 4,229,985 | A * | 10/1980 | Borello | F16H 15/42 476/53 |
| 5,179,865 | A * | 1/1993 | Line | F16H 15/20 476/22 |
| 5,924,953 | A * | 7/1999 | Rohs | F16H 15/42 476/52 |
| 7,553,254 | B2 * | 6/2009 | Rohs | F16H 61/6649 476/11 |
| 7,654,930 | B2 * | 2/2010 | Rohs | F16H 15/42 476/52 |
| 8,303,462 | B2 * | 11/2012 | Rohs | C10M 101/02 476/51 |
| 8,733,209 | B2 * | 5/2014 | Schneider | B60K 6/48 180/65.245 |
| 9,328,810 | B2 * | 5/2016 | Raney | F16H 37/086 |
| 2014/0087915 | A1 | 3/2014 | Rohs et al. | |

FOREIGN PATENT DOCUMENTS

| | | |
|---|---|---|
| DE | 10 2010 025 027 A1 | 12/2011 |
| DE | 11 2011 100 163 T5 | 10/2012 |
| EP | 1 729 037 A1 | 12/2006 |
| JP | 2010-151186 A1 | 7/2010 |
| WO | 2004/031617 A2 | 4/2004 |
| WO | 2004/031622 A1 | 4/2004 |
| WO | 2006/012892 A2 | 2/2006 |
| WO | 2007/025522 A2 | 3/2007 |
| WO | 2011/160621 A2 | 12/2011 |

OTHER PUBLICATIONS

International Search Report of PCT/DE2013/000640, mailed Feb. 11, 2014.
German Search Report in 10 2012 021 171.6, dated Jul. 24, 2013, with English translation of relevant parts.
Search Report in CN 201380056582.9.

* cited by examiner

CONICAL FRICTION RING TRANSMISSION

CROSS REFERENCE TO RELATED APPLICATIONS

This application is the National Stage of PCT/DE2013/000640 filed on Oct. 29, 2013, which claims priority under 35 U.S.C. §119 of German Application No. 10 2012 021 171.6 filed on Oct. 29, 2012, the disclosure of which is incorporated by reference. The international application under PCT article 21(2) was not published in English.

The invention relates to a conical friction ring transmission having two cones disposed at a distance from one another by a gap, and having a friction ring that interacts with the cones, which ring is disposed to be displaceable axially along the gap by a displacement path, by means of adjustment means that act on the friction ring by way of guide elements, wherein the adjustment means comprise an adjustment device having a first actuator, which device can be controlled by way of an adjustment drive, and a securing device having a second actuator, which device adjusts the friction ring into a safety track in the event of failure of the controllable adjustment device.

Such conical friction ring transmissions are known, for example, from WO 2004/031622 A1 or from WO 2006/012892 A2, wherein these conical friction ring drives have a relatively complicated construction, particularly with regard to their safety device, or safety devices that act purely mechanically, by means of springs or the like, and therefore do without a second actuator, are provided. The latter is also disclosed, for example, by JP 2010-151186 A1, EP 1 729 037 A1, and U.S. Pat. No. 3,195,365. DE 10 2010 025 007 A1 also provides for a purely mechanical safety concept resulting from mechanical feedback. DE 11 2011 100 163 T5 and DE 10 2010 025 027 A1 also do not disclose a separate safety device or a second actuator for any kind of safety aspect with regard to the position of the friction ring.

It is the task of the present invention to provide a safety device that has the simplest possible construction in conical friction ring transmissions of the stated type. As a solution, a conical friction ring transmission having the characteristics of claims 1, 6 and/or 9 is proposed, having the common overarching fundamental idea of intervening in the adjustment mechanism in controllable manner, by means of an actuator that has the simplest possible structure. Further advantageous embodiments are found in the dependent claims and in the following description.

For example, a conical friction ring transmission has a relatively uncomplicated construction if the safety device comprises a normal state in which electrical energy is applied to it and a failure state in which it is free of electrical energy, and makes a transition from the normal state to the failure state in the event of failure of the controllable adjustment device. If a suitable design is present, it is possible to do without a separate power supply that guarantees proper functionality of the safety device even in the event of a power failure, thereby particularly ensuring a conical friction ring transmission that is not very complicated.

Preferably, the safety device comprises a converter that converts electrical energy into mechanical energy, as the actuator, and an element biased by the converter in the normal state, such as a spring, for example, wherein the biased element does not possess any action connection with the controllable adjustment device in the normal state, and is in a biased action connection with the controllable adjustment device in the failure state. Because of the action connection in the biased state, the biased element can act on the controllable adjustment device in such a manner, in a failure state, that the friction ring is adjusted into the safety track. It is true that this embodiment has the disadvantage that the converter is supplied with electrical energy in the normal state, in order to work against the biased element and to bias it, so that the energy consumption is increased. However, with a suitable embodiment of this arrangement, this additional energy consumption can be restricted to a minimum.

A corresponding conical friction ring transmission is particularly energy-saving if the converter comprises an electromagnet as one of two modules that can be moved relative to one another, and a component that can be moved by the magnet, preferably a ferromagnetic component, as the other of these two modules that can be Moved relative to one another. In particular, the converter can also have a related armature. It is true that such an arrangement at first requires a relatively large amount of energy in order to get from the normal state into the failure state. However, with a suitable formation of the corresponding modules, the magnetic field lines can be concentrated in the normal state in such a manner that a noteworthy reduction of the energy consumption in the normal state is possible, and nevertheless the two components that can be moved relative to one another bias the biased element. If the electrical energy is then no longer supplied to the magnets, the biased element relaxes and can act on the controllable adjustment device with its remaining bias.

Accordingly, it is advantageous if the converter has two modules that can be moved relative to one another, which are acted on, in the normal state, by the converter, with a force determined by the electrical energy, counter to the bias of the biased element.

The arrangement as a whole has a particularly compact construction if two regions of action of the biased element that interact with the two modules of the converter that can be moved relative to one another, such as two ends of a corresponding spring, and/or both modules of the converter that can be moved relative to one another are disposed on a mechanical deflection element of the controllable adjustment device. Such a deflection element, such as a deflection rod, for example, is frequently present in a conical friction ring transmission in any case, so that hardly any additional construction space thereby becomes necessary for the safety device.

The arrangement as a whole has a particularly compact construction if both the two modules of the converter that can be moved relative to one another and the regions of action of the biased element that interact with the two modules of the converter that can be moved relative to one another are disposed on the mechanical deflection element of the controllable adjustment device.

The conical friction ring transmission furthermore has a relatively uncomplicated construction if the safety device comprises a bi-stable safety actuator having a normal position and a failure position. Such bi-stable safety actuators are relatively small, in terms of the design, particularly since multiple positions to be assumed, which also require more construction space, or complex regulation and control mechanisms are absent, which mechanisms are not necessary in actuators having multiple stable positions, for example in rotary-motor-driven drives, stepper motors, or complex transmission arrangements.

A bi-stable safety actuator can be implemented, in concrete terms, in particularly compact manner, if this actuator comprises an electromagnet and a biased element that works against the electromagnet, such as a spring, for example.

Also, a conical friction ring transmission has a particularly uncomplicated construction if the safety device comprises a mechanical deflection element of the controllable adjustment device and changes the action variable of the mechanical deflection element between the adjustment drive and the guide elements in the event of a failure of the controllable adjustment device. In this way, it can be guaranteed, in the case of a suitable embodiment, that the safety device ultimately acts on the guide elements of the friction ring by way of the same modules, such as the mechanical deflection element, for example.

For example, the safety device can particularly change the action length of a deflection rod of the controllable adjustment device in the event of failure of the controllable adjustment device, if this action length is the action variable of the mechanical deflection element. For example, a deflection rod can be lengthened by means of a bi-stable actuator, in particularly compact manner, in that length variability of a corresponding actuator that is inserted directly into the deflection rod is utilized accordingly.

However, even in the case of rotating deflection elements, a bi-stable actuator that can move back and forth accordingly between two rotational positions can be utilized to change the action variable.

In particular, also as a distinction from EP 1 729 037 A1, the safety device can act on mechanical deflection elements that act between the adjustment drive and the guide elements, such as, for example, on a deflection rod that acts between the adjustment drive and the guide elements, or on corresponding rotating deflection elements that act between the adjustment drive and the guide elements, such as, for example, gear wheels and the like. This particularly allows a structurally simple and therefore also compact suspension of the corresponding adjustment drive, which is generally significantly more complex and heavy than an actuator of the safety device.

Preferably, the safety device has a stop by which the safety track is defined, for example. Likewise, the stop can be used to guide the biased element accordingly or to keep it biased.

Preferably, the controllable adjustment device comprises an adjustment bridge that can be freely displaced axially in a cage, which bridge can be controlled by way of a deflector, such as a deflection rod, for example, a deflection lever or a deflection element, by means of the adjustment drive, and preferably carries the guide elements.

Suitable rollers or also slide stones or slide surfaces can serve as guide elements, for example.

Preferably, the friction ring runs around a cone, engaging around it. In this connection, it is particularly preferably disposed in the gap between the cones, because this allows great press-down forces between the cones and the friction ring, in extremely compact manner.

Ultimately, any device that has a motor or converts energy can preferably be used as an adjustment drive. It is true that manual adjustment drives are also conceivable, but they are frequently not a possibility in motor vehicles, for reasons of energy efficiency or driver convenience.

It is understood that the characteristics of the solutions described above and in the claims can also be combined, if applicable, in order to be able to implement the advantages cumulatively, accordingly.

Figure 2:
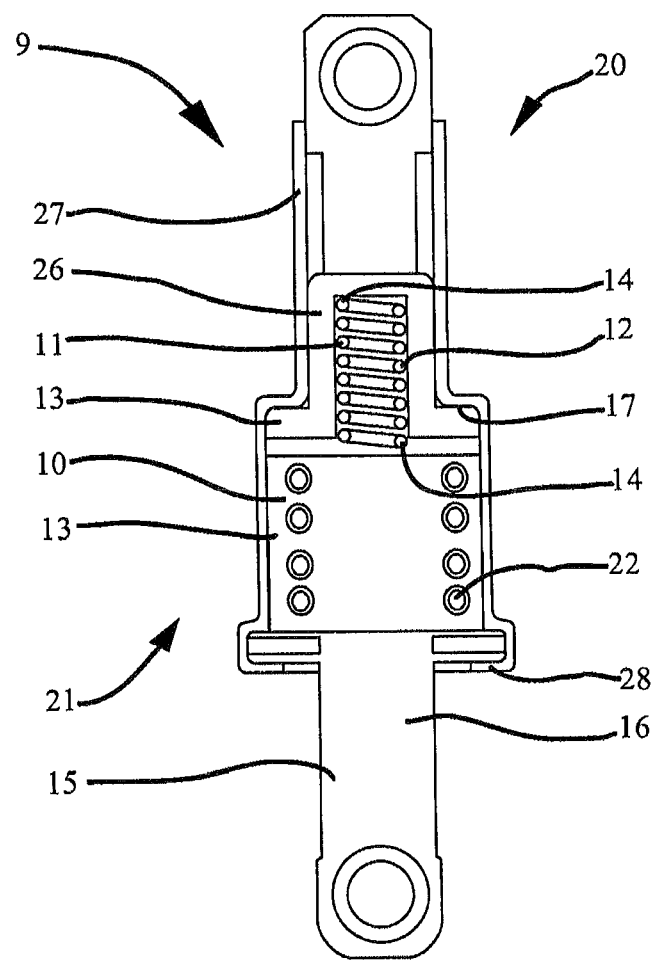
Figure 3:
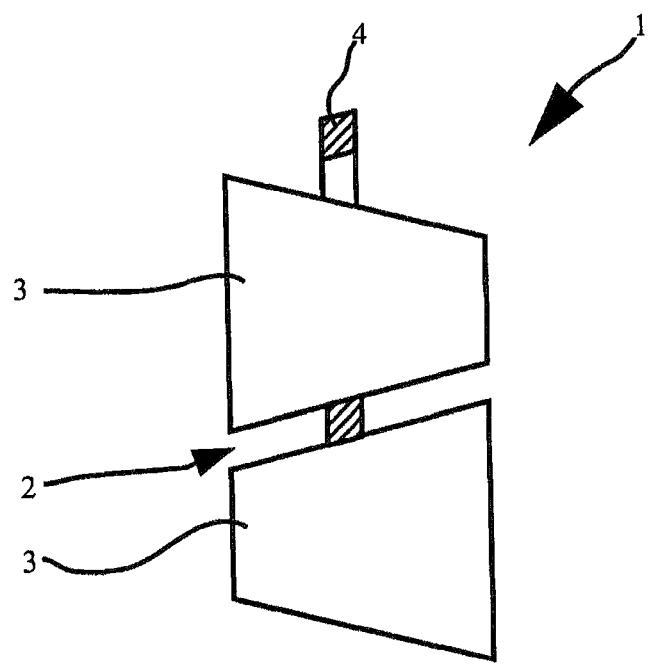
Figure 4:
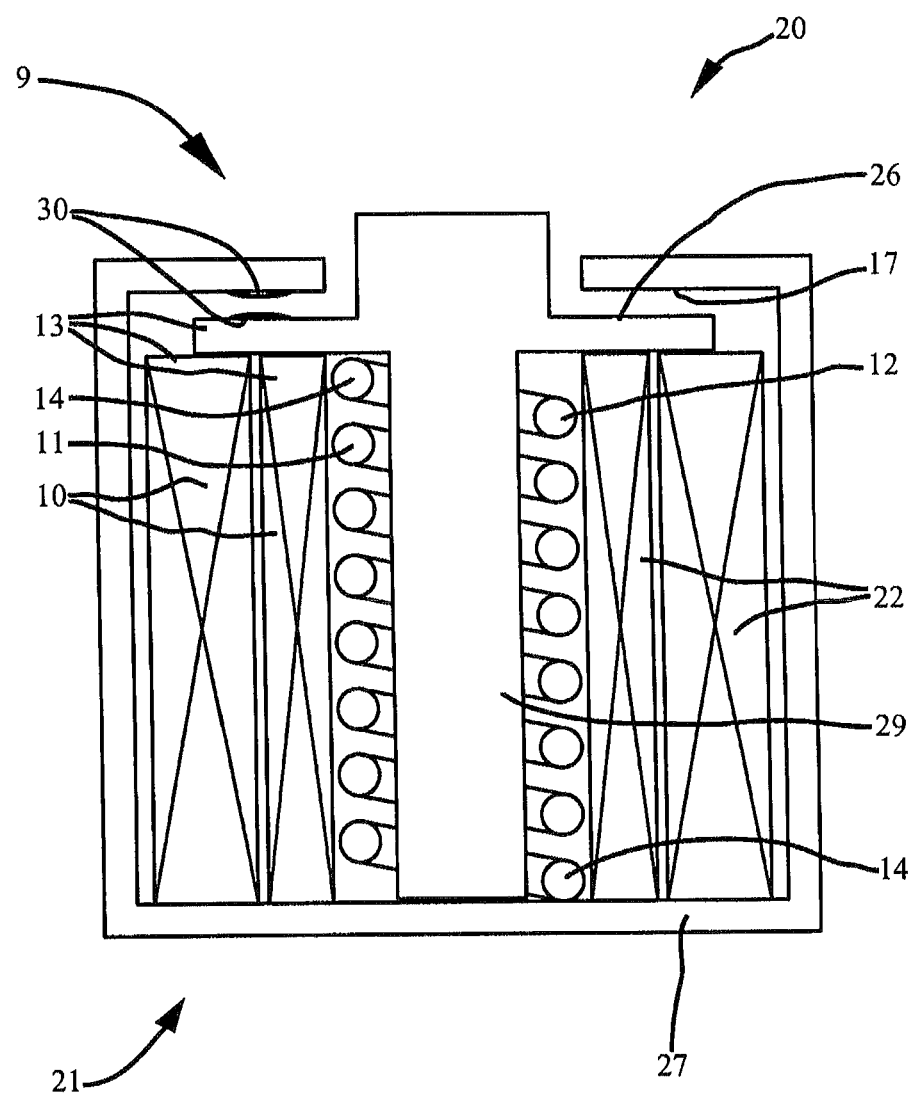
Figure 5:
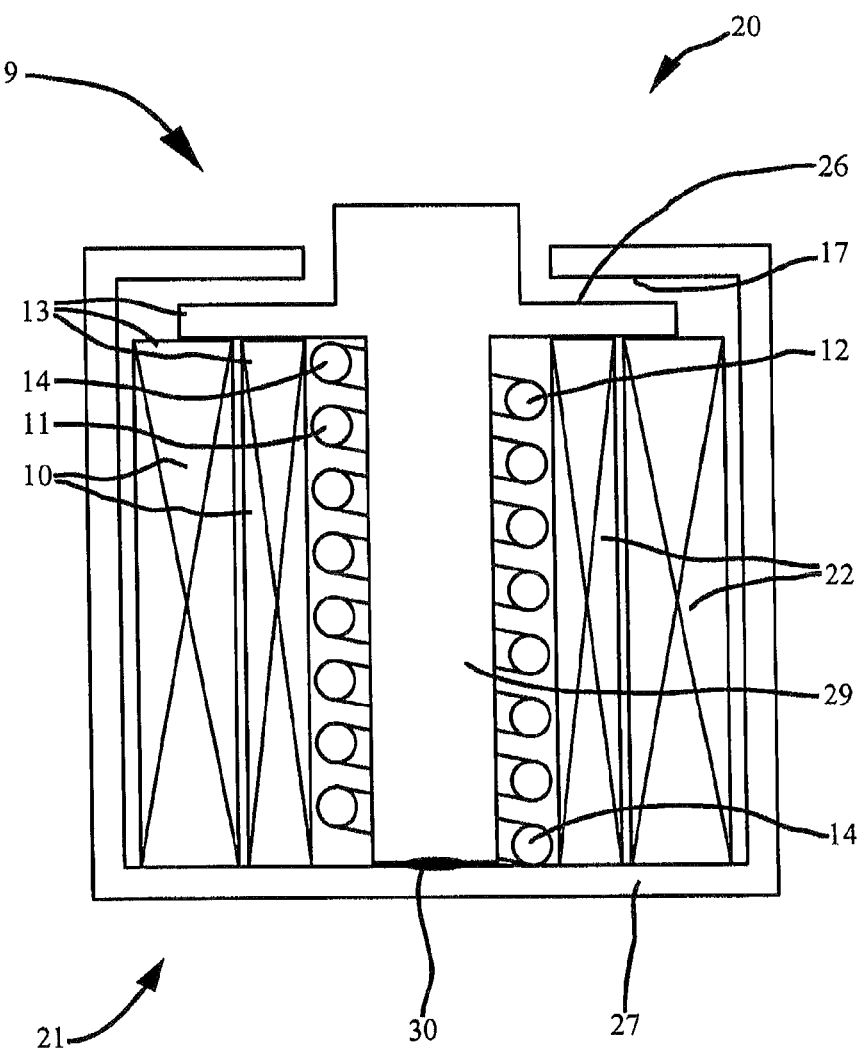
Figure 6:
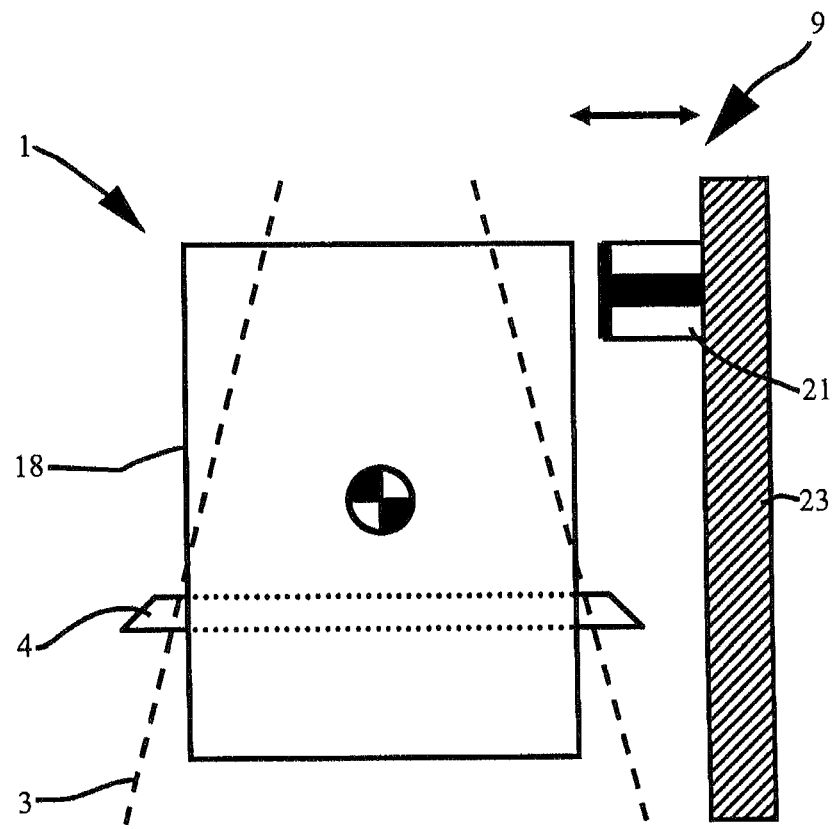

Further advantages, goals, and properties of the present invention will be explained using the following description of exemplary embodiments, which are particularly also shown in the attached drawing. The drawing shows:

FIG. 1 a friction ring having an adjustment bridge, safety device, and adjustment drive;

FIG. 2 a schematic section through the safety device according to FIG. 2;

FIG. 3 a schematic representation of a conical friction ring transmission, in which the arrangement according to FIGS. 1 and 2 can be used;

FIG. 4 an alternative safety device in a representation similar to FIG. 2;

FIG. 5 a further alternative safety device in a representation similar to FIG. 2; and FIG. 6 a schematic top view of a conical friction ring transmission having a safety device in a different position.

In the conical friction ring transmission 1 according to FIGS. 1 to 3, two cones 3 are spaced apart from one another by a gap 2, in which a friction ring 4 that interacts with the cones with friction runs around one of the cones 3, engaging around it.

In this connection, the friction ring 4 is guided in an adjustment bridge 19, which in turn is guided in axially free manner, to be displaceable parallel to the gap, by way of guide elements 6 (numbered as an example), which are implemented by means of small guide wheels in this exemplary embodiment. The cage 18 is mounted in a housing 23, in known manner, so as to rotate about an axis parallel to a plane spanned by the axes of the cones 3, so that the friction ring 4 can be changed with regard to its angle of attack with reference to the two cones 3. By means of such setting, the friction ring 4 migrates along the gap 2, thereby making it possible to vary the translation ratio of the conical friction ring transmission 1 in known manner.

In this connection, it is understood that the cage 18 does not necessarily have to guide the adjustment bridge 19 by way of two axes. Instead, corresponding guidance can also take place in a different way, for example by way of only one axis, with suitable spin lock. Likewise, the adjustment bridge 19 does not necessarily have to be configured in bridge-like manner. In this regard, modified embodiments can easily be represented. Likewise, it is conceivable to configure a conical friction ring transmission 1 in such a manner that the friction ring is positioned directly and not just set on in terms of its angle, in order to then run to its position freely, in that the adjustment bridge 19 then follows the movement of the friction ring along the gap 2.

In order to set the cage 18 and thereby also the friction ring 4 in terms of its angle of attack, an adjustment drive 7 is provided, which is structured as a rotating stepper motor in this exemplary embodiment, which motor acts on the cage 18 by way of an eccentric bushing 24, a deflection rod 16 or a deflector 20, and a cage lever 25.

Therefore the adjustment bridge 19, the cage 18, the cage lever 25, the deflection rod 16, the eccentric bushing 24, and the adjustment drive 7 form adjustment means 5 in this exemplary embodiment, by means of which the friction ring 4 can be displaced along the gap 2, wherein in this exemplary embodiment, the displacement itself takes place by means of the interaction of the friction ring 4 with the cones 3, as a function of the angle of attack of the friction ring 4. The aforementioned modules of the adjustment means 5 furthermore form a controllable adjustment device 8.

The adjustment means 5 furthermore comprise a safety device 9, which is provided in the deflection rod 16 in this exemplary embodiment, and comprises not only the deflection rod 16, which forms a deflection element 15, but also a converter 10 in the form of an electromagnet 22, as well as a biased element 11 in the form of a spring 12, and a counter-piece 26 that enters into interaction with the magnet, which piece is configured in pot-like manner in this exemplary embodiment, surrounds the spring 12, and is guided in a safety device housing 27.

In this connection, the electromagnet 22 and the counter-piece 26 form two modules 13 that can be moved relative to one another, wherein the spring 12 or the biased element 11 interacts with these two movable modules 13 by way of regions of action 14, in that the element presses against the two modules 13 that can be moved relative to one another, and, when the electromagnet 22 is supplied with electrical energy, is biased by the two modules 13 that can be moved relative to one another.

In this connection, the spring 12 is restricted in terms of springing open by means of a stop 17 of the safety device housing 27 against which the counter-piece 26 impacts when it reaches a predetermined distance from the electromagnets 22. This distance is dimensioned in such a manner that the deflection rod 16 is lengthened in terms of its action length, in such a manner that the cage 18 is set, in terms of its angle, in operationally reliable manner, in every angular position of the adjustment drive 7 or of the eccentric bushing 24, so that the friction ring 4 runs into its safety track. For this purpose, the deflection rod 16 is divided in two and is firmly connected with the magnet 22, on the one hand, and firmly connected with the counter-piece 26, on the other hand.

In the normal state, the electromagnet 22 is supplied with electrical energy, so that it pulls the counter-piece 26 toward itself. As a result, the biased element 11 is biased and action length of the deflection rod 16 is shortened. In the event of a failure, particularly, for example, of the electrical energy, the electromagnet 22 loses power, which can, of course, also take place in controlled manner, accordingly, so that the spring 12 or the biased element 11 expands, until the counter-piece 26 reaches the stop 17 and the action length of the deflection rod 16 is increased accordingly. In this position, too, the biased element 11 remains under tension, so that the deflection rod 16 as a whole is sufficiently rigid to displace the friction ring 4 into its safety track in operationally reliable manner.

If necessary, a further stop can be provided, which adjusts the cage 18 back into a neutral position once the safety track has been reached, thereby compressing the biased element 11 again slightly.

The safety device housing 27 is configured as a sheet-metal bushing and fixed in place on the magnet and the related part of the deflection rod 16 in the region of the electromagnet 22 by means of tabs 28. In the other part of the deflection rod 16, the safety device housing 27 only surrounds this part of the deflection rod 16, so that the latter part can move with regard to the safety device housing 27, by means of the spring force or the magnetic force.

The arrangement of the converter 10 with its two movable modules 13, in other words the electromagnet 22 as well as the counter-piece 26, and the stop 17, forms a bi-stable safety actuator 21 having a normal position and a failure position, between which the safety actuator 21 runs back and forth in unregulated manner. In this connection, it is understood that corresponding running can take place in the one direction during a start, in each instance, in other words from the failure position to the normal position, and in the other direction during a stop, in other words from the normal position to the failure position. The latter can be implemented, in each instance, by applying electricity to the safety actuator 21 or not. For the remainder, an unregulated transition into the failure position can then take place during a failure situation, accordingly.

The safety actuators 21 shown in FIGS. 4 and 5 are also constructed accordingly and can be inserted into a deflection rod 16 accordingly.

However, in the exemplary embodiments according to FIGS. 4 and 5, the biased element 11 or the spring 12 is disposed within the electromagnet 22, thereby resulting in an even more compact construction of the arrangement as a whole. Also, in these exemplary embodiments the counter-piece 26 is configured all the way into the spring 12 and the electromagnet 22, so that it represents an armature 29 for the electromagnet 22. It is understood that instead, an armature firmly connected with the safety device housing 27 or, for example, with the deflection rod 16, can be used, if the counter-piece 26 is merely configured in plate-like manner.

In all the safety devices 9, the field line progression of the electromagnets 22 can be optimized, if the modules 13 lie closely against one another, in such a manner that only a minimal holding energy is required, so that the energy supply of electrical energy can be correspondingly throttled, if necessary. For the latter, the electromagnets 22 of the exemplary embodiments shown in FIGS. 4 and 5 are formed from two winding sets, a winding set that lies radially on the inside and a winding set that lies radially on the outside, wherein the winding set that lies radially on the inside suffices, in terms of its dimensioning, to hold the counter-piece 26 in the normal state, while the winding set that lies radially on the outside is only used if the counter-piece 26 is to be transferred from the failure state or its failure position to the normal state or its normal position. In this regard, the outer winding set is not supplied with electrical energy in the normal state, thereby making it possible to save electrical energy very easily, accordingly.

For this purpose, the exemplary embodiments shown in FIGS. 4 and 5 each have electrical contacts 30, wherein the electrical contacts 30 are closed in the exemplary embodiment shown in FIG. 4, when the arrangement is in the failure state. In the exemplary embodiment shown in FIG. 5, the electrical contacts are closed when the arrangement is in the normal state. In this connection, in the exemplary embodiment according to FIG. 5, the circuit for the windings of the electromagnet 22 that lie radially on the outside is severed when the armature 29 reaches the safety device housing 27. In the exemplary embodiment shown in FIG. 4, on the other hand, the current supply can take place directly by way of the contacts 30, if the dimensioning is such that the magnetic energy remaining in the outer windings after the electrical contacts 30 have been severed is sufficient to transfer the armature 29 all the way to the normal position once it has been accelerated.

A corresponding safety device 9, particularly a safety device 9 corresponding to FIGS. 4 and 5, does not necessarily have to be provided in a deflection rod 16 or a deflection element 15. Instead, it can also act directly on the cage 18, if it is affixed in the housing 23 in a suitable position, as shown schematically in FIG. 6.

REFERENCE SYMBOL LIST 1 conical friction ring transmission
2 gap
3 cone
4 friction ring
5 adjustment means
6 guide element
7 adjustment drive 8 controllable adjustment device
9 safety device
10 converter
11 biased element
12 spring
13 module
14 region of action
15 deflection element
16 deflection rod
17 stop
18 cage
19 adjustment bridge
20 deflector
21 safety actuator
22 electromagnet
23 housing
24 eccentric bushing
25 cage lever
26 counter-piece
27 safety device housing
28 tab
29 armature
30 electrical contact

The invention claimed is:

1. Conical friction ring transmission (1) having two cones (3) disposed at a distance from one another by a gap (2), and having a friction ring (4) that interacts with the cones (3), which ring is disposed to be displaceable axially along the gap (2) by a displacement path, by means of adjustment means (5) that act on the friction ring (4) by way of guide elements (6), wherein the adjustment means (5) comprise an adjustment device (8) having a first actuator, which device can be controlled by way of an adjustment drive (7), and a securing device (9) having a second actuator, which device adjusts the friction ring (4) into a safety track in the event of failure of the controllable adjustment device (8), wherein the safety device (9) comprises a normal state in which electrical energy is applied to it and a failure state in which it is free of electrical energy, and makes a transition from the normal state to the failure state in the event of failure of the controllable adjustment device (8).

2. Conical friction ring transmission (1) according to claim 1, wherein the safety device (9) comprises a converter (10) that converts electrical energy into mechanical energy, and an element (11) biased by the converter (10) in the normal state, particularly a spring (12), which element does not possess any action connection with the controllable adjustment device (8) in the normal state, and is in a biased action connection with the controllable adjustment device (8) in the failure state.

3. Conical friction ring transmission (1) according to claim 2, wherein the converter (10) has two modules (13) that can be moved relative to one another, which are acted on, in the normal state, by the converter (10), with a force determined by the electrical energy, counter to the bias of the biased element (11).

4. Conical friction ring transmission (1) according to claim 3, wherein both regions of action (14) of the biased element (11) that interact with the two modules (13) of the converter (10) that can be moved relative to one another and/or both modules (13) of the converter (10) that can be moved relative to one another are disposed on a mechanical deflection element (15) of the controllable adjustment device (8).

5. Conical friction ring transmission (1) according to claim 4, wherein the deflection element (15) is a deflection rod (16).

6. Conical friction ring transmission (1) according to claim 1, the safety device (9) has a stop (17).

7. Conical friction ring transmission (1) according to claim 1, wherein the controllable adjustment device (8) comprises an adjustment bridge (19) that can be freely displaced axially in a cage (18), which bridge can be controlled by way of a deflector (20), by means of the adjustment drive.

8. Conical friction ring transmission (1) according to claim 7, wherein the deflector (20) is the deflection rod (16).

9. Conical friction ring transmission (1) according to claim 1, wherein the safety device (9) acts on mechanical deflection elements that act between the adjustment drive (7) and the guide elements (6), such as, for example, on a deflection rod (16) that acts between the adjustment drive (7) and the guide elements (6).

10. Conical friction ring transmission (1) having two cones (3) disposed at a distance from one another by a gap (2), and having a friction ring (4) that interacts with the cones (3), which ring is disposed to be displaceable axially along the gap (2) by a displacement path, by means of adjustment means (5) that act on the friction ring (4) by way of guide elements (6), wherein the adjustment means (5) comprise an adjustment device (8) having a first actuator, which device can be controlled by way of an adjustment drive (7), and a securing device (9) having a second actuator, which device adjusts the friction ring (4) into a safety track in the event of failure of the controllable adjustment device (8), wherein the safety device (9) comprises a bi-stable safety actuator (21) having a normal position and a failure position.

11. Conical friction ring transmission (1) according to claim 10, wherein the safety actuator (21) runs between the normal position and the failure position in unregulated manner.

12. Conical friction ring transmission (1) according to claim 10, wherein the safety actuator (21) comprises an electromagnet (22) and a biased element (11) that works against the electromagnet (22), particularly a spring (12).

13. Conical friction ring transmission (1) having two cones (3) disposed at a distance from one another by a gap (2), and having a friction ring (4) that interacts with the cones (3), which ring is disposed to be displaceable axially along the gap (2) by a displacement path, by means of adjustment means (5) that act on the friction ring (4) by way of guide elements (6), wherein the adjustment means (5) comprise an adjustment device (8) having a first actuator, which device can be controlled by way of an adjustment drive (7), and a securing device (9) having a second actuator, which device adjusts the friction ring (4) into a safety track in the event of failure of the controllable adjustment device (8), wherein the safety device (9) comprises a mechanical deflection element (15) of the controllable adjustment device (8), and changes the action variable of the mechanical deflection element (15) between the adjustment drive (7) and the guide elements (6) in the event of a failure of the controllable adjustment device (8).

14. Conical friction ring transmission (1) according to claim 13, wherein the safety device (9) changes the action length of a deflection rod (16) of the controllable adjustment device (8) as an action variable of the mechanical deflection element (15) in the event of the failure of the controllable adjustment device (8).

* * * * *